United States Patent
Shrestha et al.

(10) Patent No.: US 7,558,204 B2
(45) Date of Patent: Jul. 7, 2009

(54) DATA FLOW CONTROL FOR MULTI-LAYERED PROTOCOL STACK

(75) Inventors: Bimal Shrestha, Tampere (FI); Arto Suomi, Tampere (FI); Tarja Hirvonen, Lempaala (FI)

(73) Assignee: Nokia Corporation, Espoo (FI)

( * ) Notice: Subject to any disclaimer, the term of this patent is extended or adjusted under 35 U.S.C. 154(b) by 899 days.

(21) Appl. No.: 10/917,840

(22) Filed: Aug. 13, 2004

(65) Prior Publication Data

US 2005/0058072 A1    Mar. 17, 2005

(30) Foreign Application Priority Data

Aug. 15, 2003   (WO) ................ PCT/IB03/03330

(51) Int. Cl.
   H04L 12/26   (2006.01)
(52) U.S. Cl. .................... 370/235; 370/231; 370/469
(58) Field of Classification Search ............... 370/310, 370/231, 329, 235
   See application file for complete search history.

(56) References Cited

U.S. PATENT DOCUMENTS

| | | | | |
|---|---|---|---|---|
| 6,233,224 | B1 * | 5/2001 | Yamashita et al. | 370/231 |
| 6,363,058 | B1 * | 3/2002 | Roobol et al. | 370/310 |
| 6,553,006 | B1 * | 4/2003 | Kalliokulju et al. | 370/310 |
| 6,920,121 | B2 * | 7/2005 | Tan | 370/329 |
| 7,266,081 | B2 * | 9/2007 | Suum ki et al. | 370/235 |

FOREIGN PATENT DOCUMENTS

| | | |
|---|---|---|
| WO | WO 00/10334 | 2/2000 |
| WO | WO 00/49784 | 8/2000 |
| WO | WO 02/093968 | 11/2002 |

OTHER PUBLICATIONS

3rd Generation Partnership Project, ETSI TS 101 351 version 8.7.0 (Dec. 2001), "Digital cellular telecommunications system (Phase 2+); General Packet Radio Service (GPRS); Mobile Station—Serving GPRS Support Node (MS-SGSN) Logical Link Control (LLC) layer specification," (GPP TS 04.64 version 8.7.0, Release 1999), 63 pp.

* cited by examiner

Primary Examiner—Chi H Pham
Assistant Examiner—Albert T Chou
(74) Attorney, Agent, or Firm—Alfred A. Fressola; Ware, Fressola, Van Der Sluys & Adolphson, LLP

(57) ABSTRACT

The invention relates to a system, device, method and computer program product for controlling the flows of a plurality of Data Units (DUs) over logical links, the system comprising at least two first-type Link Control (LC) entities (40-1a . . . 40-8a), wherein each first-type LC entity transforms a first-type DU into a second-type DU and vice versa, and provides a first interface (43-1 . . . 43-8a) for the first-type DUs and a second interface for the second type DUs, and a second-type LC entity (5a) with interfaces (50-1a . . . 50-8a) for the second-type DUs, wherein the second interface of each of the first-type LC entities (40-1a . . . 40-8a) is directly connected to one respective interface (50-1a . . . 50-8a) of the second-type LC entity (5a), and wherein the second-type LC entity (5a) comprises a flow control device (52a) for separately controlling the respective flows of the second-type DUs, which are transferred over its respective interfaces (50-1a . . . 50-8a).

26 Claims, 4 Drawing Sheets

DATA FLOW CONTROL FOR MULTI-LAYERED PROTOCOL STACK

CROSS-REFERENCE TO RELATED APPLICATIONS

This application claims priority under 35 USC §119 to International Patent Application No. PCT/IB03/03330 filed on Aug. 15, 2003.

FIELD OF THE INVENTION

The invention relates to a system and a device for controlling the flows of a plurality of Data Units (DUs) over logical links. The invention further relates to a method and a computer program product for controlling the flows of a plurality of DUs over a logical link.

BACKGROUND OF THE INVENTION

Data transfer in cellular radio systems such as the Global System for Mobile Communications (GSM) or the Universal Mobile Telecommunications System (UMTS) is growing more and more complex with the advent of a mix of advanced multi-media applications and services. For optimum use and fair distribution of the scarce radio resource, more sophisticated data flow control techniques are required, where "flow control" is understood as the management of data flow between nodes of the cellular radio system, e.g. the mobile and base stations, so that the data can be handled at an efficient pace. Too much data arriving before a device at one of said nodes can handle it causes data overflow, meaning the data is either lost or must be retransmitted. An example for sophisticated data flow control techniques is the introduction of priority-based data flow control, where data is assigned a Quality of Service (QoS) parameter and/or a pre-defined service class and where data flow then is handled under consideration of the QoS parameter and/or service class, e.g. in order to optimise transfer of the data with the highest QoS requirements. Lack of proper priority-based data flow control can result in resources being wasted for lower priority services, ultimately dissatisfying the mobile subscriber.

FIG. 1 depicts a part of the protocol stack of the General Packet Radio Service (GPRS) that has been integrated into the GSM protocol stack in the scope of the GSM phase 2+ development in order to use the GSM radio resources more efficiently. The GPRS protocol stack controls the communication of a Mobile Station (MS) 1 and a Serving GPRS Support Node (SGSN) 2 via a Base Station Subsystem (BSS) 3.

In the sequel, the Logical Link Control (LLC) layer 4 of the GPRS protocol stack as depicted in FIG. 1 will be of primary interest. This layer and its functionality is standardised by the European Telecommunications Standardisation Institute (ETSI) and described in technical document 3GPP TS 04.64 (version 8.7.0, December 2001).

The LLC layer 4 is considered as a sub-layer of layer-2 in the ISO/OSI 7-layer reference model and operates above the Radio Link Control (RLC) layer 5 and Base Station Subsystem GPRS Protocol (BSSGP) layer 6 to provide logical links between layer-3 entities in a MS 1 and layer-3 peer entities in its associated SGSN 2. Above the LLC layer 4, i.e. in the network layer (layer-3 of the ISO/OSI model) 7, are located the Tunnelling of Messages (TOM) protocol 7-1, the GPRS Mobility Management (GMM) protocol 7-2, the Sub-Network Dependent Convergence (SNDC) layer 7-3, and the SMS protocol 7-4.

The RLC protocol 5 in combination with the Medium Access Control (MAC) protocol 8 operates on top of the GSM Radio Frequency (RF) channel (physical layer) 9 and realises the reliable packet-oriented transmission between MS 1 and BSS 3 by statistical multiplexing of several logical connections on the Packet Data Channels (PDCHs) available for GPRS in a radio cell. While RLC/MAC contains already an Automatic Repeat Request (ARQ) scheme to handle transmission errors on the air interface, the LLC protocol 4 provides a reliable ciphered logical link between MS 1 and SGSN 2 by applying flow control and error handling mechanisms known from link layer protocols like the Integrated Services Digital Network (ISDN). The ARQ scheme in LLC is not designed to handle transmission errors on the air interface, but for handling frame losses and errors in the fixed network or for link recovery after a cell change. The BSSGP 6, which is operating on top of a network service 10 such as Frame Relay (FR) and an underlying layer-1 (L1) protocol 11, is responsible for flow control between BSS 3 and SGSN 2. The conversion between the RLC protocol 5 and the BSSGP protocol 6 is performed by means of a relay 12 in the BSS 3.

The TOM protocol 7-1 is a generic protocol layer used for the exchange of TOM protocol envelopes between the MS 1 and the SGSN 2. The GMM protocol 7-2 uses the services of the LLC layer 4 to transfer messages between the MS 1 and the SGSN 2. It includes functions such as attachment and authentication, and transport of session management messages for functions such as PDP context activation and deactivation. Network layer protocols are intended to be capable of operating services derived from a wide variety of sub-networks and data links. GPRS supports several network layer protocols providing protocol transparency for the users of the service. Therefore, all functions related to transfer of network layer PDUs are carried out in a transparent way by the GPRS network entities. SNDCP 7-3 provides this adaptation of different network layers to the logical link by mapping different packet data protocols (e.g., Internet Protocol (IP) data packets) onto the services provided by the LLC layer.

The SMS protocol 7-4 uses the services of the LLC layer 4 to transfer short messages between the MS 1 and SGSN 2.

FIG. 2 gives a more detailed view of the structure of the LLC layer 4 as seen from the MS 1 side, wherein the signalling transfer between the components of FIG. 2 is given in dashed lines and the joint signalling and data transfer is given in solid lines. The LLC layer 4 comprises a plurality of LLC Entities (LLEs) 40-1 ... 40-8, an LLC management entity 41, a multiplexer 42, and a plurality of LLC-SAPs 43-1 ... 43-9. Via the SAPs 43-1 ... 43-8, the services of the LLEs 40-1 ... 40-8 are provided for the protocols of the network layer 7, i.e. the SMS protocol 7-1, the GMM protocol 7-2, the SNDCP 7-3 and the TOM protocol 7-4. There exists also a pure signalling link between the GMM protocol 7-2 and the LLC management entity 41 via the SAP 43-9. Below the LLC layer 4, the RLC layer 5 and the MAC layer 8 are situated. The LLC frames from the multiplexer 42 are passed to the RLC layer 5 via one single RLC-SAP 50-1.

The LLC layer 4 provides four LLC-SAPs 43-2 ... 43-5 to the SNDCP 7-3, where the SNDCP 7-3 manages the actual data packet transmission. In GPRS, four radio priority levels are defined. Correspondingly, four LLC-SAPs are required for packet data transmission, wherein the SAP Identifier (SAPI) identifies the point at which LLC services are provided by an LLC entity to a network layer entity. The SAPIs for said four radio priority levels are SAPI=3, 5, 9 and 11, respectively. The services that are made available via the LLC-SAPs 43-2 . . . 43-5 are provided by the LLEs 40-2 . . . 40-5. Each LLE controls the information flow of N-PDUs that are transferred as LLC Service Data Units (LLC-SDUs) within LLC-PDUs on the LLC link/connection between peer LLEs in the MS 1 and SGSN 2, respectively. These N-PDUs are transferred between the LLE and the above SNDCP 7-3 via a corresponding LLC-SAP. LLEs provide the SNDCP 7-3 unacknowledged/acknowledged information transfer, flow control (in Asynchronous Balanced Mode) and frame error detection. Each LLC connection is identified by a Data Link Connection Identifier (DLCI) that consists of a SAPI and a Temporary Logical Link Identifier (TLLI). As already stated. The SAPI is used to identify the SAP on the SGSN 2 side and the MS 1 side of the LLC interface, SAPI is carried in the address field of each LLC frame. The TLLI is used to identify a specific MS 1. TLLI assignments is controlled by GMM. TLLI is not carried in LLC frames.

The multiplexer 42 represents an entity that multiplexes the LLC connections of the respective LLEs 40-1 . . . 40-8 and outputs LLC frames (LLC-PDUs) that are transferred to the peer multiplexer entity in the remote SGSN 2 LLC layer 4. On LLC frame transmission, the multiplexer 42 generates and inserts the Frame Check Sequence (FCS), performs the frame ciphering function, and provides SAPI-based LLC layer contention resolution between the various LLEs 40-1 . . . 40-8 whose connections are multiplexed. On LLC frame reception, the multiplexer 42 performs the frame decipher function and checks the FCS. If the frame passes the FCS check, the multiplex procedure distributes the LLC frame to the appropriate LLE. For the ciphering function, a ciphering key is produced with the ciphering algorithm, for instance starting from an identification key and a non-predictable random number generated by an authentication centre. The FCS typically consists of a 24 bit cyclic redundancy check (CRC) code. The CRC-24 is used to detect bit errors in the frame header and information fields.

When being passed to the RLC layer 5 via the RLC-SAP 50-1, the LLC frames from the multiplexer 42 are segmented into RLC data blocks. At the RLC layer 5 and MAC layer 8, a selective ARQ between the MS 1 and the network provides retransmission of erroneous RLC data blocks. When a complete LLC frame is successfully transferred across the RLC layer, it is forwarded to the peer LLC entity in the SGSN 2.

By multiplexing the connections of the different LLEs 40-1 . . . 40-8 into LLC frames, the multiplexer 42 provides a common interface between the LLC layer 4 and the RLC layer 5 (via the single RLC-SAP 50-1) for all signalling and data transfers. However, the multiplexer also represents a bottleneck for smooth data flow of the different LLC connections that are controlled by the respective LLEs 40-1 . . . 40-8. This is due to the fact that the RLC layer, which has a good view of the radio resources that are available for the transmission of its RLC data blocks, has no possibility to separately control the data flows of the different LLC connections over the single RLC-SAP 50-1 due to the multiplexing procedure. It is thus not possible for the RLC layer 5 to adapt the flows of the different LLC connections with their different QoS requirements to the transmission state of the underlying radio resource, a fact that deteriorates the overall data flow of the LLC-PDUs over the LLC links and thus also the flow of the N-PDUs that are contained as LLC-SDUs in the LLC-PDUs.

SUMMARY OF THE INVENTION

It is thus an object of the present invention to provide an improved control of the flow of data units over logical links in a communication system that operates a multi-layered protocol stack.

It is proposed that a system for controlling the flows of a plurality of Data Units (DUs) over logical links comprises at least two first-type Link Control (LC) means, wherein each first-type LC means transforms a first-type DU into a second-type DU and vice versa, and provides a first interface for said first-type DUs and a second interface for said second type DUs, and a second-type LC means with interfaces for said second-type DUs, wherein the second interface of each of said first-type LC means is directly connected to one respective interface of said second-type LC means, and wherein said second-type LC means comprises means for separately controlling the respective flows of the second-type DUs, which are transferred over its respective interfaces.

As compared to the prior art, the present invention omits the use of a multiplexer that multiplexes the respective second-type DUs, which are transferred via the second interfaces of the respective first-type LC means, and that transfers the multiplexed second-type DUs via a single interface of a second LC means. Instead, the present invention proposes a second-type LC means with several interfaces, wherein each of said interfaces is directly connected to one respective second interface of each of said at least two first-type LC means. The second-type LC means is equipped with means to control the flows of the second-type DUs over its respective interfaces. As a result, the present invention allows to separately control the flows of respective second-type DUs that have been transformed from respective first-type DUs in respective first-type LC means. Due to the one-to-one relationship of the first-type DUs and the second-type DUs that have been transformed by the same first-type LC means, the second-type LC means is thus able to control the flows of the respective first-type DUs that are transferred via respective first interfaces of said respective first-type LC means, as well. In other words, according to the present invention, the flows of the respective first-type DUs that are passed to respective first interfaces of the respective first-type LC means can be controlled by said second-type LC means.

According to the system of the present invention, it is preferred that said first-type LC means transforms said first-type DU into a second-type DU and vice versa by performing at least a frame check function and a ciphering function. The omission of the prior-art multiplexer requires partial functionality of the multiplexer, at least the insertion and the check of a frame check sequence and the ciphering and de-ciphering of frames, to be integrated into each of said first-type LC means. The transformation of first-type DUs into second-type DUs then comprises insertion of a frame check sequence and ciphering, whereas the transformation of second-type DUs into first-type DUs comprises at least deciphering and checking of the frame check sequence. Note that, according to the system of the present invention, it is still possible to have the prior art set-up with first-type DUs that do not perform a frame check function and ciphering function, and whose DUs, that are transferred via their respective second interfaces, are multiplexed by a multiplexer, that performs the frame check function and ciphering function, and transferred via a separate interface of said second-type LC means. The present invention only demands that there exist at least two first-type LC means with frame checking and ciphering functionality and that said second-type LC means has interfaces to be connected exclusively to the second interfaces of said at least two first-type LC means. An interface of the multiplexer thus can be connected to a further interface of said second-type LC means, but separate flow control then is only possible for the DUs that have been transformed by the first-type LC means without being multiplexed afterwards, whereas the flow of the multiplexed DUs can only be jointly controlled.

According to the system of the present invention, it is further preferred that at least two first-type LC means can be differentiated by characteristics of the first-type DUs that are transferred via their respective first interfaces, and that said means for separately controlling the respective flows of the second-type DUs, which are transferred over said respective interfaces of said second-type LC means, controls said respective flows of said second-type DUs under consideration of said characteristics of the first-type DUs to which or from which said second-type DUs are transformed. The at least two distinguishable first-type LC means are thus suited for the transfer and transformation of at least two different types of first-type DUs, and due to the direct connection between the second interfaces of each first-type LC means with a respective interface of said second-type LC means and the ability of the second-type LC means to separately control the flows of the second-type DUs that are transferred via its respective interfaces, the flow of the first-type DUs that are transferred via the first interfaces of said at least two distinguishable first-type LC means can be controlled by said second LC means. Equally well, it is possible to have as many distinguishable first-type LC means (and corresponding first-type DUs) as there are interfaces of the second-type LC means.

According to the system of the present invention, it is preferred that said second-type LC means comprises at least one DU buffer for buffering second-type DUs that are transferred over its respective interfaces. The DU buffer stores the second-type DUs that are to be transferred over a joint transmission link that may at least be partially controlled by the second-type LC means.

According to the system of the present invention, it is further preferred that said means for separately controlling the respective flows of the second-type DUs, which are transferred over said respective interfaces of said second-type LC means, controls said respective flows of said second-type DUs under consideration of said characteristics of the first-type DUs to which or from which said second-type DUs are transformed, and under consideration of the state of said at least one DU buffer. Then the respective flows of said second-type DUs over the respective interfaces of said second-type DU can be adapted to the state of the buffer. The state of the buffer may describe the number of stored DUs, the number of free storage units, information on the velocity or storage and clearance of the buffer, etc. For instance, if the buffer is only cleared slowly, the second-type LC means may decrease the flow of all second-type DUs, or may only decrease the flow of second-type DUs over one of its respective interfaces.

According to the system of the present invention, it is further preferred that said second-type LC means comprises means for evaluating the state of a physical transmission link over which said second-type DUs are transferred. Said second-type DUs can either be directly or indirectly transferred over said physical transmission link, i.e. it is well possible that there are further LC means located between said second-type LC means and said physical transmission link. Correspondingly, said second-type DUs may be further transformed before being transferred over said physical transmission channel or not. The state of the physical transmission link may be characterised by any parameter or combination of parameters that is relevant for data transmission, for instance the available transmission bandwidth, error characteristics, delay characteristics, signal-to-noise or carrier-to-interference ratios, etc.

According to the system of the present invention, it is further preferred that said means for separately controlling the respective flows of the second-type DUs, which are transferred over said respective interfaces of said second-type LC means, controls said respective flows of said second-type DUs under consideration of said characteristics of the first-type DUs to which or from which said second-type DUs are transformed, and under consideration of the state of said physical transmission link over which said second-type DUs are transferred. Both the characteristics of the distinguishable first-type DUs and the state of the physical transmission link thus determine the flow control.

According to the system of the present invention, it is further preferred that said means for separately controlling the respective flows of the second-type DUs, which are transferred via said respective interfaces of said second-type LC means, comprises means for operating a flow control protocol. The flow control protocol controls the respective flows of the second-type DUs over said respective interfaces of said second-type LC means and may communicate with the respective first-type LC means by control commands in order to request further second-type DUs that may be stored in buffers of said first-type LC means or to block further sending of second-type DUs from the buffers of the first-type LC means.

According to the system of the present invention, it is further preferred that said flow control protocol is the XOn/XOff flow control protocol. Therein, the receiving data buffer sends an XOff command to the sending data buffer when the receiving buffer is full, and sends an XOn command to the sending data buffer when it is ready for further data buffering. Also other flow control protocols are possible.

According to the system of the present invention, it is further preferred that said characteristics are the Quality of Service (QoS) requirements of said first-type DUs. The first-type DUs that are transformed by said first-type LC means into second-type LC means then can be differentially prioritised by said second-type LC means. For instance, when said buffer of said second-type LC means is filling more and more, said second-type LC means may reduce the flow of the second-type DUs that correspond to said first-type DUs with the lowest QoS requirements, so that at least the second-type DUs with the higher QoS requirements can be further processed by means that follow said buffer in said second-type LC means, wherein said means that follow said buffer may for instance be the sender/receiver of said physical transmission link or a further LC means that controls said physical transmission link. QoS requirements may comprise information on the availability of the network, the throughput (effective data rate), the packet loss, the latency (delay) and jitter (latency variation).

According to the system of the present invention, it is preferred that the system further comprises a link management means that controls said first-type LC means. Said control may for instance comprise parameter initialisation, error processing and connection flow control invocation.

According to the system of the present invention, it is preferred that said logical links are the logical links between Mobile Station (MS) and the Serving GPRS Support Node (SGSN) of a mobile radio system operated according to the General Packet Radio Service (GPRS) standard or a derivative thereof, that said first-type LC means are the Logical Link Control (LLC) entities of the GPRS LLC protocol with additional sequence-based frame checking and ciphering functionality, that said first interfaces are the Service Access Points of the LLC entities (LLC-SAPs), that said second-type DUs are LLC frames, that said interfaces of said second-type LC means are Radio Link Control (RLC)-SAPs, that said first-type DUs are N-PDUs of the GPRS Network layer protocol, and that said second-type LC means implements the functionality of the GPRS RLC protocol and further comprises said means for separately controlling the respective flows of the LLC frames, which are transferred via said respective RLC-SAPs.

The N-PDUs with different QoS requirements, e.g. representing N-PDUs of the SNDCP, have to be transferred between peer entities in the MS network layer and the SGSN network layer, respectively, by encapsulating them as LLC-SDUs in LLC-PDUs that are transferred over logical links between peer LLEs. According to the invention, the connections between the LLEs that are made available to the network layer at the LLC-SAPIs can now be controlled separately for each LLC-SAPI, because, according to the system of the present invention, the LLC connections are no longer multiplexed before using the RLC connection service at a single RLC-SAP, but separately use respective RLC connections that are made available at several respective RLC-SAPs. With the omission of the prior-art LLC multiplexer, there exists virtually no flow obstruction between the RLC entities and the network layer entities, e.g. the SNDCP entities. The RLC layer thus can have full data flow control of the data that is to be transferred over each LLC-SAP. The RLC layer communicates directly with the LLEs for both the up- and downlink data flow, for instance by an XOn/XOff flow control protocol, wherein the LLEs have their own small buffers. If there arise problems in the RLC buffers or on the radio link, flow control can suspend the transmission of low priority SNDCP PDUs and maintain the transmission of high priority SNDCP PDUs instead. Apart from the fact that the number of primitives between the entities is significantly reduced, which results in reduced MCU load and buffer usage, the multiplexer itself and its expensive buffers can be omitted.

It is further proposed that a device for controlling the flows of a plurality of Data Units (DUs) over logical links of a communication system comprises at least two first-type Link Control (LC) means, wherein each first-type LC means transforms a first-type DU into a second-type DU and vice versa, and provides a first interface for said first-type DUs and a second interface for said second type DUs, and a second-type LC means with interfaces for said second-type DUs, wherein the second interface of each of said first-type LC means is directly connected to one respective interface of said second-type LC means, and wherein said second-type LC means comprises means for separately controlling the respective flows of the second-type DUs, which are transferred over its respective interfaces. Said device may for instance represent a mobile terminal, in particular a mobile phone, a Personal Digital Assistant (PDA), or a computer equipped with a network card, in a communication system operated according to the GPRS standard or derivatives thereof, or may constitute a part of such a terminal.

It is further proposed that a method for controlling the flows of a plurality of Data Units (DUs) over logical links comprises the steps of transferring first type Data Units (DUs) via respective first interfaces of at least two first-type Link Control (LC) means; transforming said first-type DUs into second-type DUs and vice versa in said respective first-type LC means; transferring said second-type DUs via respective second interfaces of said first-type LC means; transferring said second-type DUs via respective interfaces of a second-type LC means, wherein said second interface of each of said first-type LC means is directly connected to one respective interface of said second-type LC means; and separately controlling the respective flows of the second-type DUs, which are transferred over the respective interfaces of said second-type LC means.

According to the method of the present invention, it is preferred that said step of transforming said first-type DUs into second-type DUs and vice versa comprises at least a frame check function and a ciphering function.

According to the method of the present invention, it is preferred that at least two first-type LC means can be differentiated by characteristics of the first-type DUs that are transferred via their respective first interfaces, and that in said step of separately controlling said respective flows of the second-type DUs over said respective interfaces, said characteristics of the first-type DUs to which or from which said second-type DUs are transformed are considered.

According to the method of the present invention, it is preferred that said method further comprises the step of buffering second-type DUs that are transferred over said respective interfaces of said second-type LC means in at least one DU buffer.

According to the method of the present invention, it is preferred that in said step of separately controlling said respective flows of the second-type DUs over said respective interfaces, said characteristics of the first-type DUs to which or from which said second-type DUs are transformed, and the state of said at least one DU buffer are considered.

According to the method of the present invention, it is preferred that said method further comprises the step of evaluating the state of a physical transmission link over which said second-type DUs are transferred.

According to the method of the present invention, it is preferred that in said step of separately controlling said respective flows of the second-type DUs over said respective interfaces, said characteristics of the first-type DUs to which or from which said second-type DUs are transformed, and said evaluated state of said transmission link are considered.

According to the method of the present invention, it is preferred that said step of separately controlling said respective flows of the second-type DUs over said respective interfaces comprises the steps required for operating a flow control protocol.

According to the method of the present invention, it is preferred that said flow control protocol is the XOn/XOff flow control protocol.

According to the method of the present invention, it is preferred that said characteristics are the Quality of Service (QoS) requirements of said first-type DUs.

According to the method of the present invention, it is preferred that the method further comprises the step of controlling said first-type LC means by a link management means.

According to the method of the present invention, it is preferred that said logical links are the logical links between a Mobile Station (MS) and a Serving GPRS Support Node (SGSN) of a mobile radio system operated according to the General Packet Radio Service (GPRS) standard or a derivative thereof, that said first-type LC means are the Logical Link Control (LLC) entities of the GPRS LLC protocol with additional sequence-based frame checking and ciphering functionality, that said first interfaces are the Service Access Points of the LLC entities (LLC-SAPs), that said second-type DUs are LLC frames, that said interfaces of said second-type LC means are Radio Link Control (RLC)-SAPs, that said first-type DUs are N-PDUs of the GPRS Network layer protocol, and that said second-type LC means implements the functionality of the GPRS RLC protocol and further performs the step of separately controlling the respective flows of the LLC frames, which are transferred via at least two of the RLC-SAPs, under consideration of the characteristics of the N-PDUs to which or from which said LLC frames are transformed.

Furthermore, a computer program product is proposed, wherein said computer program product is directly loadable into the internal memory of a digital computer, and comprises software code portions for performing the method steps of the above mentioned method claims when said product is run on a computer.

BRIEF DESCRIPTION OF THE FIGURES

These and other aspects of the invention will be apparent from and elucidated with reference to the embodiments described hereinafter. In the figures show.

DETAILED DESCRIPTION

Figure 1:
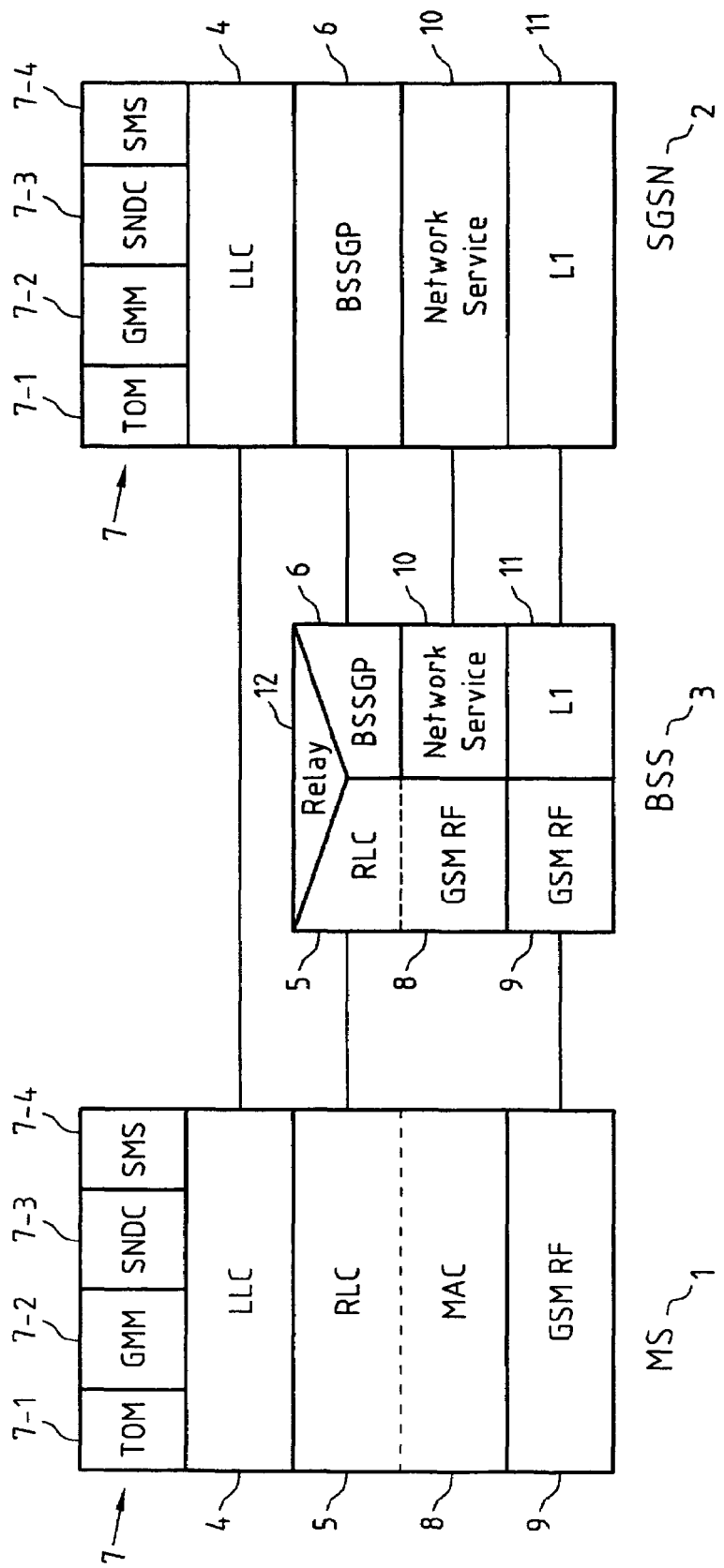
FIG. 1: an overview of the lower three protocol layers of the prior art protocol stack of the General Packet Radio Service (GPRS) system.
Figure 2:
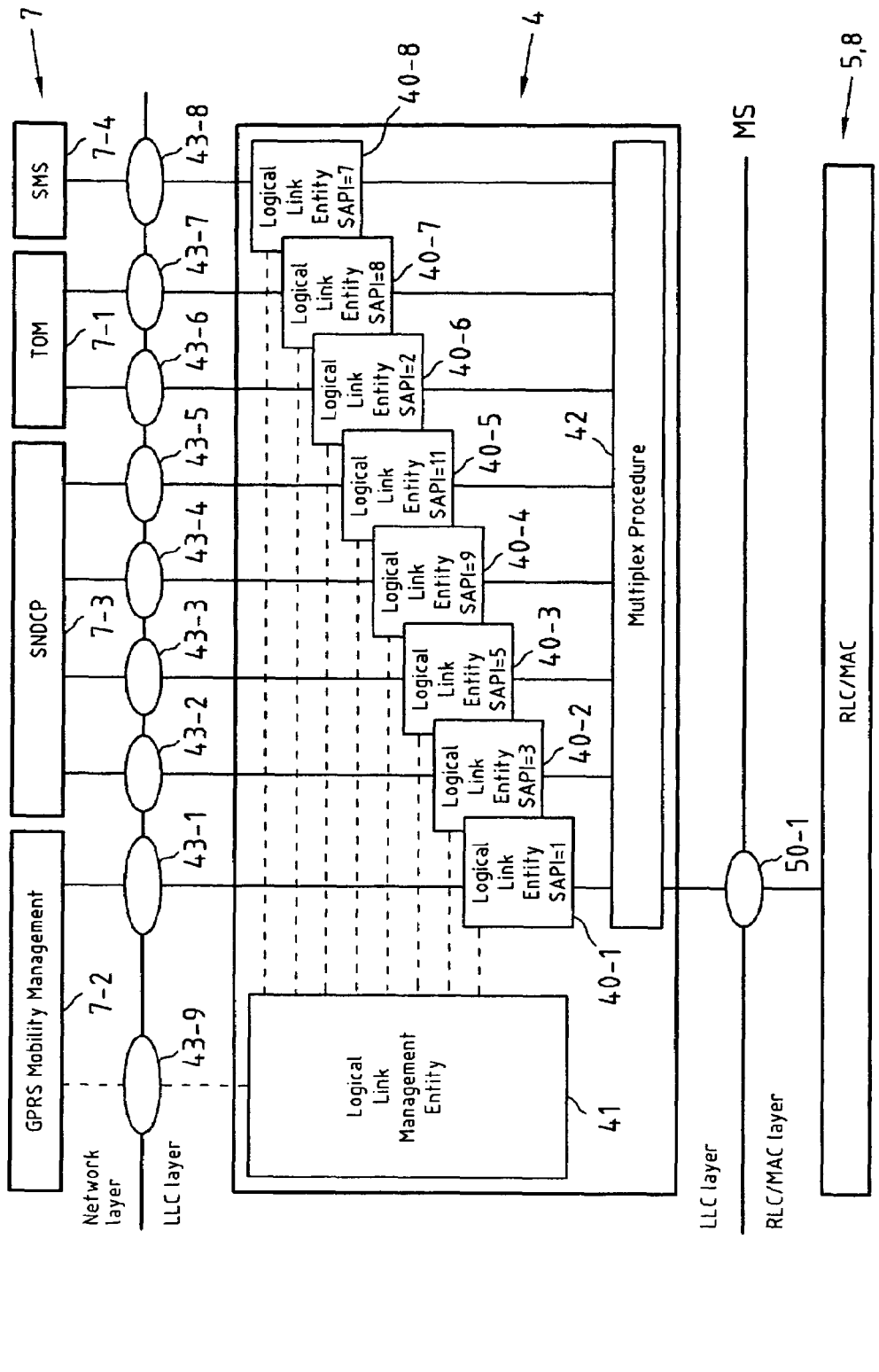
FIG. 2: a detailed view of the structure of the prior art LLC and RLC layers of a GPRS protocol stack as seen from the Mobile Station (MS) side.
Figure 3:
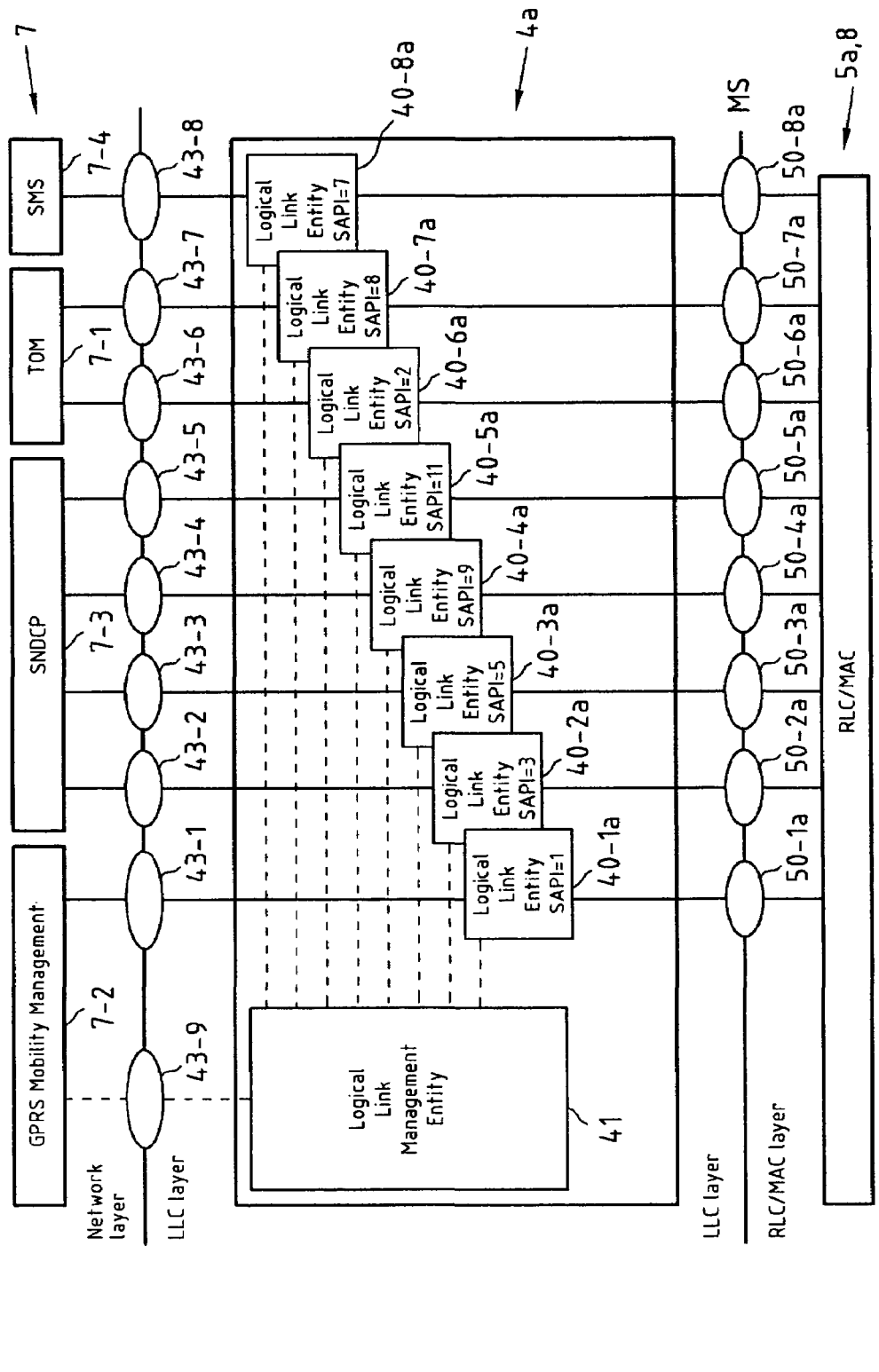
FIG. 3: a detailed view of the structure of the LLC and RLC layers of a GPRS protocol stack as seen from the MS side according to the present invention.

FIG. 3 depicts the structure of the Logical Link Control (LLC) 4a and Radio Link Control (RLC) 5a layers of a GPRS protocol stack as seen from the MS 1 side, containing the modifications according to the present invention. The modifications of the prior art protocol stack as depicted in FIGS. 1 and 2 only affect the LLC layer 4a and the RLC layer 5a. For the description of the network layer 7 above the LLC layer 4a and of the Medium Access Control (MAC) layer 8 below the RLC layer 5a, it is referred to the corresponding description of the prior art in FIGS. 1 and 2.

In contrast to the prior art protocol stack of FIG. 2, the protocol stack according to the present invention comprises a modified LLC layer 4a, which is deprived of its multiplexer 42. The multiplexer functionality has been moved to the modified LLC entities (LLEs) 40-1a . . . 40-8a, which are each connected to one LLC Service Access Point (LLC-SAPs) 43-1 . . . 43-8, respectively. The modified LLEs 40-1a . . . 40-8a are no longer connected to the prior art multiplexer 42, but are connected with MAC-SAPs 50-1a . . . 50-8a, respectively. The modified LLEs 40-1a . . . 40-8a are still controlled by an LLC management entity 41.

User data packets, for instance Internet Protocol (IP) data packets, are adapted to the services provided by the LLC layer 4a by means of the Sub-Network Dependent Convergence Protocol (SNDCP). The SNDCP uses Network Protocol Data Units (N-PDUs) to transfer the information of user data packets between network layer peer entities. The transfer of N-PDUs between network entities uses QoS-dependent LLC connections that are provided by the modified LLEs 40-2a . . . 40-5a and made available to the network layer via the LLC-SAPs 43-2 . . . 43-5. In the LLC layer 4a, N-PDUs are transmitted as LLC Service Data Units (LLC-SDU) that are part of LLC-PDUs (LLC frames). The LLC PDUs are transferred between peer LLC entities in the MS 1 and SGSN 2, respectively, by using the connections offered by the underlying RLC layer. Once again, the LLC-PDUs are then transmitted as LLC-SDUs as part of RLC-PDUs.

Due to the omission of the prior art multiplexer 42, LLC frames are no longer multiplexed, so that there exists one RLC-SAP 50-1a . . . 50-8a for each modified LLE 40-1a . . . 40-8a. The frame checking and ciphering, which was the task of the prior art multiplexer 42, is now performed by the modified LLEs 40-1a . . . 40-8a, i.e. insertion of a frame check sequence and ciphering of the frame upon frame transmission and deciphering and check of the frame check sequence upon frame reception.

The modified RLC layer 5a now advantageously controls the flow of LLC frames that correspond to different QoS requirements of the N-PDUs they are related to, respectively. This is achieved by operating an XOn/XOff protocol between the modified RLC layer 5a and the modified LLEs 40-1a . . . 40-8a. The modified RLC layer 5a thus can choose from which modified LLE buffer to receive further LLC frames from by sending XOn ("send more LLC frames") or XOff ("do not send more LLC frames") messages to the modified LLEs 40-1a . . . 40-8a, accordingly. The modified RLC layer 5a comprises at least one buffer for buffering the RLC frames that are to be handed to the MAC layer 8 for transmission over a physical propagation channel 9, and possesses means to evaluate the current state of said physical transmission channel 9. Being aware of the state of the physical transmission channel 9, the state of its buffer and the QoS requirements of the respective LLC frames that can be separately polled from the respective buffers in the respective modified LLEs 40-1a . . . 40-8a, the modified RLC layer 5a now can adapt the transmission of LLC frames over said physical transmission channel 9 to the QoS requirements of the LLC frames. When the channel is bad and the buffer starts to fill more and more, it is advisable to suspend the transmission of LLC frames with low QoS requirements and to concentrate on the transmission of LLC frames with higher QoS requirements. This kind of flow control of the respective LLC frames is performed on both the up- and downlink. It reduces the number of service primitives that is required for communication between the protocol entities and thus helps to reduce MCU load. Furthermore, buffer usage is reduced. The flow control of the N-PDUs that are transmitted between network entities in MS 1 and SGSN 2 under usage of the QoS-specific LLC connections is, due to the improved flow control between LLC 4a and RLC layer 5a, more granular and more adaptive to the state of the physical transmission link 9.

Figure 4:
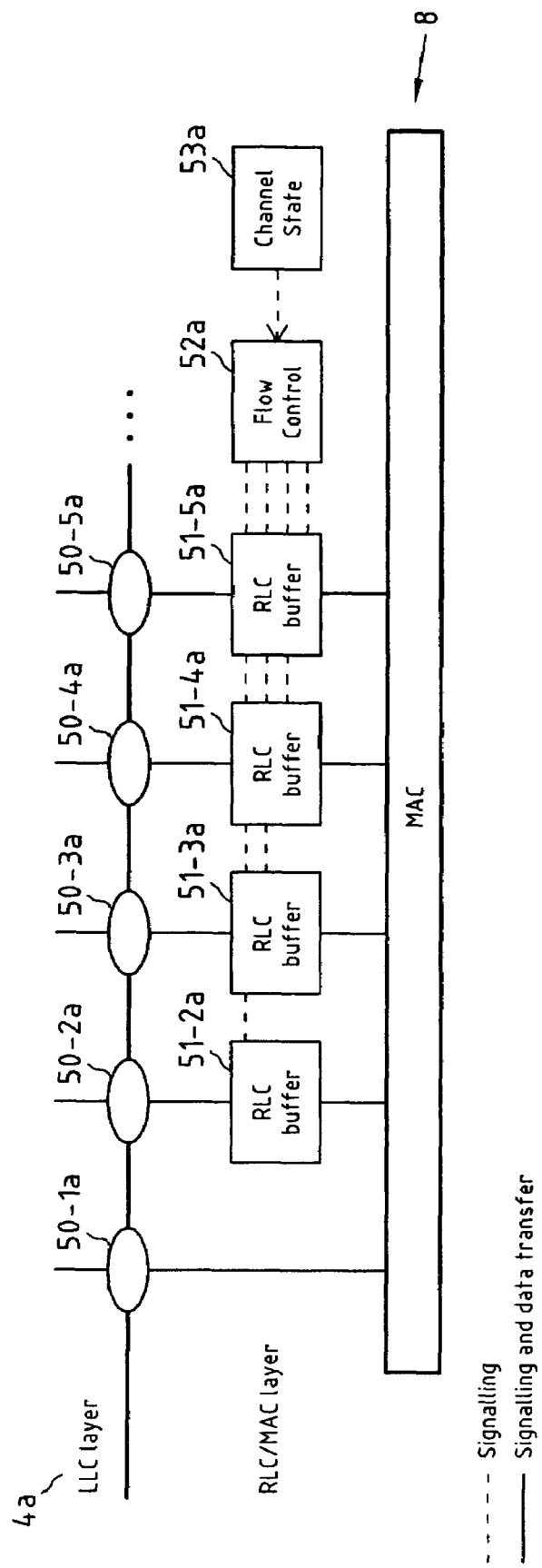
FIG. 4: a detailed view of the structure of the RLC layer as seen from the MS side according to the present invention.

FIG. 4 gives a more detailed view of a possible implementation of the RLC layer 5a of a GPRS protocol stack according to the present invention. Within the modified RLC layer 5a, RLC buffers 51-2a . . . 51-5a are provided for buffering the RLC frames (containing the LLC frames) that are to be handed to the MAC layer 8. In this exemplary implementation, RLC buffers 51-2a . . . 51-5a are provided for the respective RLC-SAPs 50-2a . . . 50-5a that offer services to the respective modified LLEs 40-2a . . . 40-5a, which in turn offer services to the SNDCP 7-3 via respective LLC-SAPs 43-2 . . . 43-5. The RLC buffers 51-2a . . . 51-5a are controlled by a flow control instance 52a. The flow control instance 52a operates an XOn/XOff protocol between the RLC buffers 51-2a . . . 51-5a and the respective modified LLEs 40-2a . . . 40-5a, so that the modified RLC layer 5a can select from which modified LLE to receive further LLC frames from, depending on knowledge on the state of the physical transmission channel 9, which is provided to the flow control instance by a channel state instance 53a. The channel state instance 53a may either determine the state of the physical transmission by its own or may receive information on the state of the physical transmission channel from higher or lower protocol layers.

The invention has been described above by means of only one out of a multiplicity of possible embodiment. It should be noted that there are alternative ways and variations which are obvious to a skilled person in the art and can be implemented without deviating from the scope and spirit of the appended claims, e.g. the invention can be used to improve the flow control in other, not necessarily wireless communication systems to overcome the bottleneck of a multiplexer in a multi-layered protocol stack. Various kinds of flow control mechanisms between the protocol layers of interest are possible. In particular, it is also possible to have hybrid systems, where the separate flow control of both a multiplexed bundle of LLC frames and of non-multiplexed LLC frames is performed.

What is claimed is:

1. An apparatus, comprising:
    at least two first-type link control components, wherein each first-type link control component is configured to transform a first-type data unit into a second-type data unit and vice versa, and is configured to provide a first interface for said first-type data units and a second interface for said second type data units, and
    a second-type link control component with interfaces for said second-type data units,
    wherein the second interface of each of said first-type link control components is directly connected to one respective interface of said second-type link control component,
    wherein said second-type link control component comprises a flow control component configured to separately control respective flows of the second-type data units, which are transferred over said respective interfaces;
    wherein said first-type link control components and said second-type link control component are both within a data link layer,
    wherein said first-type link control components are logical link control entities of a logical link control protocol,
    wherein said second-type link control component is configured to implement functionality of a radio link control protocol, and
    wherein services of said first-type link control components are provided for protocols of a network layer via each of said first interface for said first-type data units.

2. The apparatus according to claim 1, wherein said first-type link control components are configured to transform said first-type data unit into a second-type data unit and vice versa using at least a frame check function and a ciphering function.

3. The apparatus according to claim 1,
    wherein at least two first-type link control components are differentiable by characteristics of the first-type data units that are transferred via their respective first interfaces, and
    wherein said flow control component that is configured to separately control the respective flows of the second-type data units, which are transferred over said respective interfaces of said second-type link control component, is further configured to control said respective flows of said second-type data units under consideration of said characteristics of said first-type data units to which or from which said second-type data units are transformed.

4. The apparatus according to claim 3, wherein said second-type link control component comprises at least one data unit buffer configured to buffer second-type data units that are transferred over its respective interfaces.

5. The apparatus according to claim 4, wherein said flow control component that is configured to separately control the respective flows of the second-type data units, which are transferred over said respective interfaces of said second-type link control component, is further configured to control said respective flows of said second-type data units under consideration of said characteristics of the first-type data units to which or from which said second-type data units are transformed, and under consideration of the state of said at least one data unit buffer.

6. The apparatus according to claim 3, wherein said second-type link control component comprises an evaluation component configured to evaluate the state of a physical transmission link over which said second-type data units are transferred.

7. The apparatus according to claim 6, wherein said flow control component that is configured to separately control the respective flows of the second-type data units, which are transferred over said respective interfaces of said second-type link control component, is further configured to control said respective flows of said second-type data units under consideration of said characteristics of the first-type data units to which or from which said second-type data units are transformed, and under consideration of the state of said physical transmission link over which said second-type data units are transferred.

8. The apparatus according to claim 3, wherein said characteristics are the quality of service requirements of said first-type data units.

9. The apparatus according to claim 3,
    wherein said logical links are the logical links between a mobile station and the serving support node of a mobile radio system,
    wherein said first-type link control components are logical link control entities of a logical link control protocol with additional sequence-based frame checking and ciphering functionality,
    wherein said first interfaces are logical link control service access points of the logical link control entities,
    wherein said second-type data units are logical link control frames,
    wherein said interfaces of said second-type link control component are radio link control service access points,
    wherein said first-type data units are network protocol data units, and
    wherein said second-type link control component is configured to implement the functionality of the radio link control protocol and further comprises said flow control component that is configured to separately control the respective flows of the logical link control frames, which are transferred via said respective radio link control service access points.

10. The apparatus according to claim 1, wherein said flow control component that is configured to separately control the respective flows of the second-type data units, which are transferred via said respective interfaces of said second-type link control component, comprises a protocol operation component configured to operate a flow control protocol.

11. The apparatus according to claim 10, wherein said flow control protocol is an XOn/XOff flow control protocol.

12. The apparatus according to claim 1, further comprising a link management component that is configured to control said first-type link control components.

13. An apparatus comprising:
at least two first-type means for link control, wherein each first-type means for link control is for transforming a first-type data unit into a second-type data unit and vice versa, and for providing a first interface for said first-type data units and a second interface for said second type data units, and
a second-type means for link control with interfaces for said second-type data units,
wherein the second interface of each of said first-type means for link control is directly connected to one respective interface of said second-type link control component,
wherein said second-type means for link control comprises means for separately controlling respective flows of the second-type data units, which are transferred over said respective interfaces;
wherein said first-type means for link control and said second-type means for link control are both within a data link layer,
wherein said first-type means for link control are logical link control entities of a logical link control protocol,
wherein said second-type means for link control is configured to implement functionality of a radio link control protocol, and
wherein services of said first-type means for link control are provided for protocols of a network layer via each of said first interface for said first-type data units.

14. A method comprising:
transferring first type data units via respective first interfaces of at least two first-link control components;
transforming said first-type data units into second-type data units and vice versa in said respective first-type link control components;
transferring said second-type data units via respective second interfaces of said first-type link control components;
transferring said second-type data units via respective interfaces of a second-type link control component, wherein said second interface of each of said first-type link control components is directly connected to one respective interface of said second-type link control component; and
separately controlling the respective flows of the second-type data units, which are transferred over the respective interfaces of said second-type link control component,
wherein said first-type link control component and said second-type link control component are both within a data link layer,
wherein said first-type link control components are logical link control entities of a logical link control protocol,
wherein said second-type link control component is configured to implement functionality of a radio link control protocol, and
wherein services of said first-type link control components are provided for protocols of a network layer via each of said first interface for said first-type data units.

15. The method according to claim 14, wherein said transforming said first-type data units into second-type data units and vice versa comprises at least a frame check function and a ciphering function.

16. The method according to claim 14,
wherein at least two of the first-type link control components can be differentiated by characteristics of the first-type data units that are transferred via their respective first interfaces, and
wherein in said separately controlling said respective flows of the second-type data units over said respective interfaces, said characteristics of the first-type data units to which or from which said second-type data units are transformed are considered.

17. The method according to claim 16, wherein said method further comprises buffering second-type data units that are transferred over said respective interfaces of said second-type link control component in at least one data unit buffer.

18. The method according to claim 17, wherein in said separately controlling said respective flows of the second-type data units over said respective interfaces, said characteristics of the first-type data units to which or from which said second-type data units are transformed, and the state of said at least one data unit buffer are considered.

19. The method according to claim 16, wherein said method further comprises evaluating the state of a physical transmission link over which said second-type data units are transferred.

20. The method according to claim 19, wherein in said separately controlling said respective flows of the second-type data units over said respective interfaces, said characteristics of the first-type data units to which or from which said second-type data units are transformed, and said evaluated state of said transmission link are considered.

21. The method according to claim 16, wherein said characteristics are the quality of service requirements of said first-type data units.

22. The method according to claim 16,
wherein said logical links are the logical links between a mobile station and a serving support node of a mobile radio system,
wherein said first-type link control components are the logical link control entities of a logical link control protocol with additional sequence-based frame checking and ciphering functionality,
wherein said first interfaces are the service access points of the logical link control entities,
wherein said second-type data units are logical link control frames,
wherein said interfaces of said second-type link control component are radio link control service access points,
wherein said first-type data units are network protocol data units, and
wherein said second-type link control component performs said separately controlling the respective flows of the logical link control frames, which are transferred via at least two of the radio link control service access points, under consideration of the characteristics of the network protocol data units to which or from which said logical link control frames are transformed.

23. The method according to claim 14, wherein said separately controlling said respective flows of the second-type data units over said respective interfaces comprises actions required for operating a flow control protocol.

24. The method according to claim 23, wherein said flow control protocol is the XOn/XOff flow control protocol.

25. The method according to claim 14, further comprising controlling said first-type link control components by a link management component.

26. A memory portion of a digital computer, in which is loaded a computer program product comprising software code portions for performing the method of claim 14 when said product is run on a computer.

* * * * *